United States Patent [19]

Kato et al.

[11] Patent Number: 4,648,341
[45] Date of Patent: Mar. 10, 1987

[54] COMPUTERIZED SEWING MACHINE

[75] Inventors: Kenji Kato; Yoshio Yamaguchi, both of Tokyo; Yoshitaka Takahashi, Sagamihara, all of Japan

[73] Assignee: Janome Sewing Machine Co., Ltd., Tokyo, Japan

[21] Appl. No.: 753,678

[22] Filed: Jul. 10, 1985

[30] Foreign Application Priority Data

Jul. 12, 1984 [JP] Japan .................................. 59-143252

[51] Int. Cl.⁴ .............................................. D05B 3/02
[52] U.S. Cl. ...................................... 112/458; 112/457
[58] Field of Search ................. 112/457, 453, 456, 458

[56] References Cited

U.S. PATENT DOCUMENTS

| 4,142,472 | 3/1979 | Soeda et al. | 112/457 |
| 4,154,178 | 5/1979 | Brown et al. | 112/457 |
| 4,429,364 | 1/1984 | Maruyama et al. | 112/457 X |
| 4,446,520 | 5/1984 | Shigeta et al. | 112/457 X |

*Primary Examiner*—Peter Nerbun
*Attorney, Agent, or Firm*—Michael J. Striker

[57] ABSTRACT

Desired letters or other patterns to be drawn are traced with a finger on a pattern input part provided in a sewing machine frame, and patterns are selected by recognizing said letters or other patterns. The machine operator only inputs by sensitively tracing the said letter or other pattern without requiring observations to the input part.

8 Claims, 5 Drawing Figures

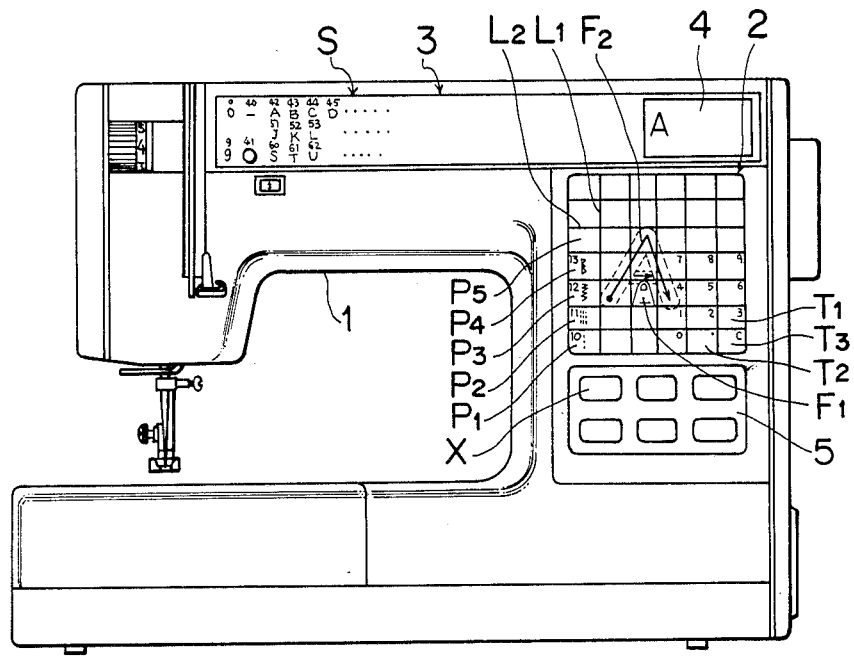
FIG_1
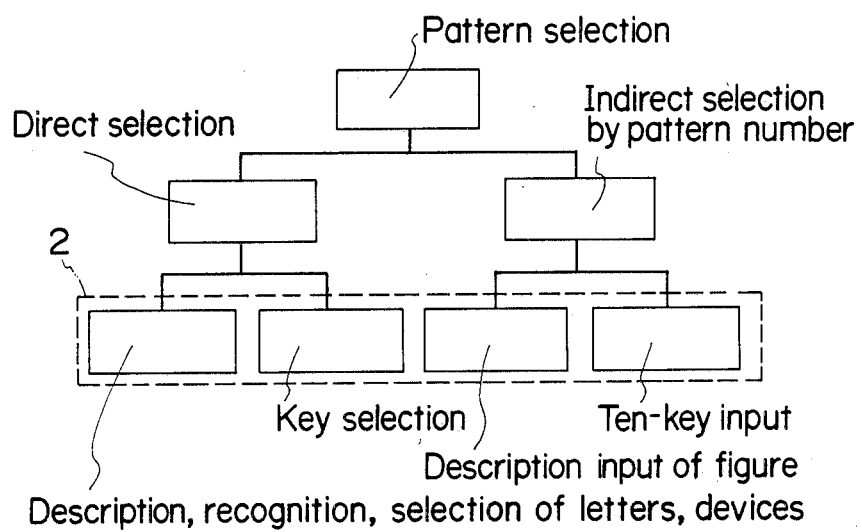
FIG_2

FIG_3 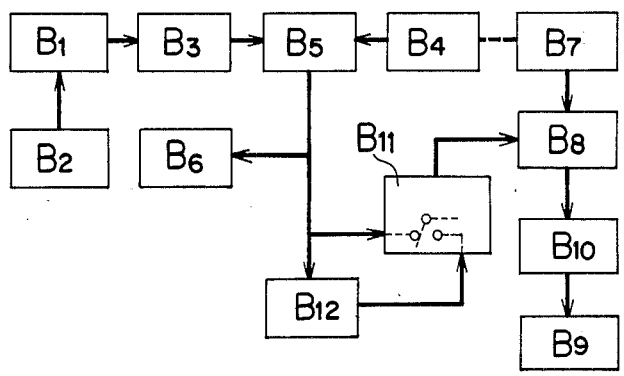

FIG_4 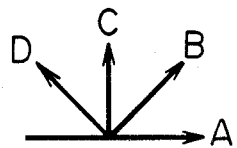

FIG_5 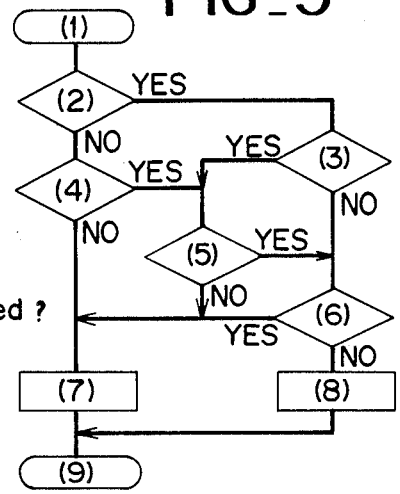

(1) Start
(2) Ten-key ?
(3)(4) More than two keys operated ?
(5) Figure ?
(6) Direct mode ?
(7) Direct selection
(8) Indirect selection
(9) Finish (B1) Detection of input information
(B3) Memory of input information
(B5) Recognition of comparison
(B4) Information memory of 2nd pattern
(B7) Information memory of 1st pattern
(B2) Timer means
(B6) Notice means
(B8) Search means
(B11) Mode switch means
(B10) Output means
(B12) Pattern numbering means
(B9) Stitch forming device

COMPUTERIZED SEWING MACHINE

FIELD OF THE INVENTION

The present invention relates to a computerized sewing machine and more particularly to a device for selecting stitching patterns, which the sewing machine stores as stitching pattern data in an electronic memory.

BACKGROUND OF THE INVENTION

A conventional sewing machine is ready for forming various kinds of stitching patterns, but it is almost impossible to arrange keys corresponding to respective patterns one by one in a limited space within a machine frame. Therefore, in recently developed sewing machines, with respect to selection of utility stitching pattern, key corresponding to respective patterns are provided, or the patterns are divided into groups, and keys are provided in correspondence to respective groups for directly selecting each of the pattern groups. For selecting stitching patterns other than the above mentioned groups, a number is designated by a ten-key to select a pattern corresponding to said number.

However, the above mentioned manner visually confirms designated patterns in a pattern indication, and selects a desired one by a key operation. In a case of other than the utility stitch, the pattern indication part is spaced apart from the ten-key. Especially, in the pattern of two figures or continuous memory stitchings of a plurality of patterns, the key and the pattern indicating part are visually observed alternately, thus causing a machine operator to feel fatigue in her eyes or erroneous recognition of the numbers.

SUMMARY OF THE INVENTION

The present invention has been devised to solve problems as mentioned above of the prior art. Letters or numerals are traced with a finger on a pattern input panel provided in a machine frame, and patterns are selected by recognizing said letters or numerals. The operator only inputs by tracing the desired letter or numeral without requiring observations to the input panel, and may prevent from the fatigue in eye and the erroneous input.

BRIEF DESCRIPTION OF THE DRAWINGS

FIG. 1 is an outer appearance of a sewing machine, showing an embodiment of the invention;

FIG. 2 is a block diagram showing a pattern selecting function;

FIG. 3 is a block diagram of controlling pattern selection;

FIG. 4 is a view showing directions of a moving finger relative to memory of a description of a second pattern information part; and FIG. 5 is a flow chart of the pattern selection control.

DETAILED DESCRIPTION OF THE MOST PREFERRED EMBODIMENT

An explanation will be made to an embodiment of the invention in reference to the attached drawings.

A machine frame 1 is provided with an input panel 2 at its front part, which is printed with vertical lines (L1) and horizontal lines (L2) on its planar surface, and constitutes a matrix. At the rear side of each block of the matrix, one or a plurality of switches (not shown) are buried which will be worked by slight finger touch on said surface, and detect the movement of a finger (F1) tracing on a letter (F2). A group of blocks are printed, on the surfaces thereof, with pattern marks and pattern numbers of frequently used patterns (P1)(P2) . . . (called as "1st pattern group" hereinafter), and these patterns are selected by pushing a switch in a corresponding block. The other group of blocks are printed with number marks 0-9 (T1), a point mark (T2) and to clear mark (T3), to form a ten-key board, and the patterns low frequency use (called as "2nd pattern group" hereinafter) are selected in accordance with a pattern number detemined by pushing switches in the ten-key board.

A pattern panel 3 is printed with patterns (S) of low frequency use, that is, the pattern marks and the pattern numbers of the 2nd pattern group. The pattern panel 3 is provided with a display 4 which shows by liquid crystal the pattern number or the letter entered on input panel 2. The display may be also complemented by a device delivering a phonetic notice.

A control key board 5 is provided with controlling keys including a selection mode switching key.

FIG. 2 is a block diagram showing a pattern selecting function of the invention, and the input of selection is operated in the input panel 2 and the control key board 5.

FIG. 3 is a block diagram of controlling pattern selection including tracing by finger (F1) the surface on the input panel 2. An input information detecting part (B7) includes the input panel 2 and detects the moving of the finger (F1) and its stroke. The movement of the finger is, as shown in FIG. 4, discriminated by dividing it into forward directions (A) (B) (C) (D) of each 45° space and into reversed directions (D) (which will be distinguished with (−)). The number of strokes and their writing is determined by the configuration of the traced character, for example, the letter A is composed of two strokes.

A new stroke following a preceding one must be effectuated within a certain time. If the stroke is not continued within this time, an information received before the last stroke is applied as input pattern information to the input information detecting part (B1). A timer means (B2) determines said time.

Input pattern information received at an input information detector (B1) is temporally stored in an input information memory (B3).

As shown in the following Table, if the letter, e.g., "A" of the pattern No. 42 is traced, referring to FIGS. 1 and 4, a writing order 1 is advanced in a B direction, and a writing order 2 is moved in a -D direction, and a writing order 3 is moved in an A direction. The phase of "A" is composed of the two strokes. The information concerning the input pattern A is stored in a 2nd pattern information memory (B4).

A comparison recognizing part (B5) compares the input pattern information of the input information memory (B3) with pattern information having a phase of the 2nd input information memory (B4), and detects corresponding pattern information. In this case, if the pattern A, for example, is detected, a notice or display means (B6) indicates "A". A 1st pattern information memory (B7) stores ordinary stitching control signals in response to the pattern as shown in the following Table.

TABLE

| Pattern Number | Patterns | 1st pattern information | | | 2nd pattern information | | |
|---|---|---|---|---|---|---|---|
| | | Stitching Number | Needle Amplitude | Fabric Feed | Stroke Order | Direction | Stroke Number |
| 42 | A | 1 | 30 | 20 | 1 | +B | 2 |
| | | 2 | 27 | 11 | 2 | −D | |
| | | 3 | 30 | 26 | 3 | +A | |
| | | 4 | 20 | 3 | 4 | — | |
| | | 5 | 30 | 26 | 5 | — | |
| | | 6 | 20 | 30 | 6 | — | |
| | | ⋮ | ⋮ | ⋮ | ⋮ | ⋮ | |
| | | 29 | 19 | 17 | 29 | — | |
| | | 30 | 30 | 15 | 30 | — | |

In the needle amplitude data of the preceding Table, the leftmost end is 30, and the rightmost end is 0. In the fabric feed data, the maximum forward is 30 and the maximum backward is 0.

A search means (B8) compares pattern information which the comparison recognizing part (B5) has compared with a second pattern information memory (B4), with the stitching pattern information of a first pattern memory (B7), and searches corresponding stitching pattern information and gives it to an output means (B10) of the stitch forming device (B9).

A selection mode switching means (B11) is operated with a switching key (X) shown in FIG. 1 and indicated by dashed lines in FIG. 3. If the pattern information recognized by the comparison recognizing part (B5) is a numeral, it is used in a direct selection mode when the switching means (B11) is switched to the left side, and the parts (B5) and (B11) directly apply said numeral to search means (B8) as numeral pattern information, i.e., information for selecting a pattern pertaining to said numeral. When the switching key (X) is switched to the right side, said numeral is used in an indirect selection mode, and the part (B5) treats it as a pattern number to be treated or modified by the pattern numbering means (B12).

The operation of the control with reference to the flowchart of FIG. 5 will be explained. When a finger (F1) touches on the input panel 2 (FIG. 1), the program starts. When any of the switches (not shown) on the rear side of the matrix of the input panel 2 is actuated over twice, the input information detecting part (B1) detects it assuming that a pattern has been selected, and the comparator (B5) recognizes this pattern, and if the pattern is not represented by a numeral, the part (B1) directly selects the stitching pattern information by means of the searching means (B8). If the selected pattern is represented by a numeral and, the switch in switching means (B11) is operated to the left side as shown in FIG. 3 it is a direct selection mode and the stitching pattern information is directly selected in accordance with this numeral. If the switch is operated to the right to introduce the indirect selection mode, said numeral is treated in (B12) for produce a modified pattern numeral, and the stitching pattern information pertaining to the pattern of said modified numeral is selected. If the selected numeral is obtained by operating more then two keys of the ten-key board (T1) of the input panel 2, the stitching pattern information can be determined directly or indirectly, in dependence upon the mode designation by the mode switching means (B11). When a key for selecting the 1st pattern group (P1), (P2) . . . is operated, the stitching pattern information is directly selected.

As stated above, in dependence upon the present invention, it is no longer required to visually observe the input part and the indication part alternately for designating the pattern, so that fatigue in the operator's eyes and erroneous input may be prevented.

What is claimed is:

1. A computerized sewing machine having a stitch forming device for changing relative positions between a needle and a fabric to be sewn to form stitches in the fabric, a stitch pattern selecting device including an input panel provided with a plurality of switching keys for entering different characters assigned to predetermined stitching patterns, said selecting device comprising a first memory (B7) storing a first group of data for a first group of stitch patterns;
a second memory (B4) storing a second group of data for a second group of stitch patterns;
input data detecting means (B1) cooperating with said input panel to generate data corresponding to actuated switching keys;
input data storing means for temporarily storing data generated by said input data detecting means;
comparing means (B5) for comparing data from said input data storing means with data stored in said second and first memories, and delivering pattern data for a pattern of said second group conforming with the input data;
indicating means (B6) for displaying the conforming pattern data from said second group;
search means connected to said first memory to read out therefrom pattern data for a pattern of said first group conforming with said input data, said search means delivering the read out data to said stitch forming device; and
selection mode changing means (B11) connected between said comparing means and said search means and being operable either in a direct selection mode in which said conforming pattern data from said second group is directly applied via said search means to said stitch forming device, or in an indirect selection mode in which the conforming pattern data is indirectly applied to said search means via a pattern data numbering means (B12).

2. A sewing machine as defined in claim 1 wherein said input data detecting means detects input information corresponding to predetermined configurations of characters generated by manually touching and tracing a succession of said switching keys on said input panel.

3. A sewing machine as defined in claim 1 wherein said characters include numerals and alphabet letters, and said first memory storing data for patterns which are directly correlated to respective characters.

4. A sewing machine as defined in claim 2 wherein said second memory stores data correlated to the configuration and a tracing order of said characters.

5. A sewing machine as defined in claim 1 wherein said input panel is arranged on a front side of a machine frame to be immediately accessible by operator.

6. A sewing machine as defined in claim 1 wherein said indicating means includes a liquid crystal display.

7. A sewing machine as defined in claim 6 wherein said indicating means includes a phonetic notice device.

8. A sewing machine as defined in claim 6 wherein said selection mode changing means includes a change-over switch arranged on said front side.

* * * * *